United States Patent
Leong et al.

(10) Patent No.: US 11,455,488 B1
(45) Date of Patent: Sep. 27, 2022

(54) PLATFORM FOR AUTOMATED SCORING OF SCIENTIFIC VISUAL MODELS

(71) Applicant: Educational Testing Service, Princeton, NJ (US)

(72) Inventors: Chee Wee Leong, Pennington, NJ (US); Lei Liu, New Hope, PA (US); Rutuja Ubale, Union City, CA (US); Lei Chen, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 861 days.

(21) Appl. No.: 16/359,524

(22) Filed: Mar. 20, 2019

Related U.S. Application Data

(60) Provisional application No. 62/645,485, filed on Mar. 20, 2018.

(51) Int. Cl.
| | |
|---|---|
| *G06K 9/62* | (2022.01) |
| *G06N 7/00* | (2006.01) |
| *G06F 3/0354* | (2013.01) |
| *G06N 3/08* | (2006.01) |

(52) U.S. Cl.
CPC ......... *G06K 9/623* (2013.01); *G06F 3/03545* (2013.01); *G06K 9/6256* (2013.01); *G06K 9/6263* (2013.01); *G06N 3/08* (2013.01); *G06N 7/005* (2013.01)

(58) Field of Classification Search
CPC .. G06K 9/623; G06K 9/6256; G06F 3/03545; G06N 7/005; G06N 3/08
See application file for complete search history.

(56) References Cited

U.S. PATENT DOCUMENTS

| | | | | |
|---|---|---|---|---|
| 2010/0075290 | A1* | 3/2010 | DeYoung | G09B 7/00 434/350 |
| 2010/0297596 | A1* | 11/2010 | Burstein | G09B 7/02 434/322 |

OTHER PUBLICATIONS

Attali, Yigal, Burnstein, Jill; Automated Essay Scoring With E-Rater v.2.0; Educational Testing Service, RR-04-05; Nov. 2005.

Corcoran, Thomas, Mosher, Frederic, Rogat, Aaron; Learning Progressions in Science: An Evidence-Based Approach to Reform; Consortium for Policy Research in Education (CPRE) Research Reports; 2009.

(Continued)

*Primary Examiner* — Ruiping Li
(74) *Attorney, Agent, or Firm* — Jones Day

(57) ABSTRACT

Systems and methods are provided for processing a drawing in a modeling prototype. A data structure associated with a visual model is accessed. The visual model is analyzed to extract construct-relevant features, where the construct-relevant features are extracted using a drawing object by identifying visual attributes of the visual model and populating a data structure for each object drawn. The visual model is analyzed to generate a statistical model, where the statistical model is generated using a multidimensional scoring rubric by targeting different constructs which compositely estimate learning progression levels, wherein the statistical model is based on features that are principally aligned with one or more of the constructs. An automated scoring is determined based on the construct-relevant features and the statistical model, where the automated scoring is stored in a computer readable medium. and is outputted for display, transmitted across a computer network, or printed.

20 Claims, 13 Drawing Sheets

(56) References Cited

OTHER PUBLICATIONS

National Research Council; Next Generation Science Standards: For States, By States; National Academies Press: Washington, DC; 2013.

National Research Council; Developing Assessments for the Next Generation Science Standards; National Academies Press: Washington, DC; 2014.

Cover, Thomas, Hart, Peter; Nearest Neighbor Pattern Classification; IEEE Transactions on Information Theory, 13(1); pp. 21-27; 1967.

Forbus, Kenneth, Usher, Jeffrey, Lovett, Andrew, Lockwood, Kate, Wetzel, Jon; CogSketch: Sketch Understanding for Cognitive Science Research and for Education; Topics in Cognitive Science, 3; pp. 648-666; 2011.

Johnson, Philip; Progression in Children's Understanding of a 'Basic' Particle Theory: A Longitudinal Study; International Journal of Science Education, 20(4); pp. 393-412; 1998.

Liu, Lei, Rogat, Aaron, Bertling, Maria; A CBAL Science Model of Cognition: Developing a Competency Model and Learning Progressions to Support Assessment Development; ETS Research Report, RR-13-29; Dec. 2013.

Madnani, Nitin, Loukina, Anastassia; RSMTool: Collection of Tools Building and Evaluating Automated Scoring Models; Journal of Open Source Software, 1(3); p. 33; 2016.

Merritt, Joi DeShawn; Tracking Students' Understanding of the Particle Nature of Matter; Ph D. Dissertation; University of Michigan; 2010.

Zechner, Klaus, Higgins, Derrick, Xi, Xiaoming, Williamson, David; Automatic Scoring of Non-Native Spontaneous Speech in Tests of Spoken English; Speech Communication, 51(10); pp. 883-895; 2009.

\* cited by examiner

| Features | Brief Description | S | MI | B | D | LP |
|---|---|---|---|---|---|---|
| Counting-based | | | | | | |
| micro-object types | # types of micro-objects | 0.368 | 0.398 | 0.834 | 0.332 | 0.381 |
| macro-object types | # types of macro-objects | -0.439 | -0.411 | -0.252 | -0.373 | -0.411 |
| micro-object color types | # types of micro-object colors | 0.197 | 0.282 | -0.033 | 0.263 | 0.207 |
| EIC deviation (EIC: Expected Intensity Count) | |EIC - # types of micro-object color-shape| | -0.382 | -0.393 | -0.148 | -0.368 | -0.382 |
| arrows | # arrow instances | 0.380 | 0.215 | 0.771 | 0.237 | 0.423 |
| arrow strengths | # mean length of arrow instances | 0.159 | 0.142 | 0.336 | 0.173 | 0.233 |
| arrow randomness | variance of direction of arrow instances | 0.132 | 0.110 | 0.528 | 0.112 | 0.258 |
| Spatial-based | | | | | | |
| i-NN-3 | mean distance to 3 NN micro-objects | 0.479 | 0.483 | 0.886 | 0.502 | 0.472 |
| i-NN-10 | mean distance to 10 NN micro-objects | 0.476 | 0.480 | 0.082 | 0.510 | 0.475 |
| dispersion | mean normalized spread between micro-objects | -0.506 | -0.532 | -0.073 | -0.551 | -0.500 |

FIG. 11

PLATFORM FOR AUTOMATED SCORING OF SCIENTIFIC VISUAL MODELS

CROSS-REFERENCE TO RELATED APPLICATIONS

This application claims priority to U.S. Provisional Application No. 62/645,485, filed Mar. 20, 2018, the entirety of which is herein incorporated by reference.

TECHNICAL FIELD

The technology described herein relates to automated scoring of scientific visual models and more particularly to evaluation of a subject's understanding of scientific concepts.

BACKGROUND

Scientists use models to represent their understanding of a phenomenon, including facilitating the development of research questions, explanations, predictions, and communications with others. Intuitively, evaluation of visual models created by students to represent their scientific understanding is a promising way to assess application of knowledge acquired. However, scaling up evaluation of such visual models require standardization of a feature framework to disentangle artistic elements from modeling skills to ensure fairness in the scoring process. Further, human scoring of these visual models is often inconsistent and results in unfair assessments. The technology described herein uses construct-relevant features to build scoring models that are interpretable and deployable in a large-scale setting for automated scoring.

SUMMARY

Systems and methods are provided for processing a drawing in a modeling prototype. A data structure associated with a visual model is accessed. The visual model is analyzed to extract construct-relevant features, where the construct-relevant features are extracted using a drawing object by identifying visual attributes of the visual model and populating a data structure for each object drawn. The visual model is analyzed to generate a statistical model, where the statistical model is generated using a multidimensional scoring rubric by targeting different constructs which compositely estimate learning progression levels, wherein the statistical model is based on features that are principally aligned with one or more of the constructs. An automated scoring is determined based on the construct-relevant features and the statistical model, where the automated scoring is stored in a computer readable medium and is outputted for display on a graphical user interface, transmitted across a computer network, or printed.

As another example, a system for processing a drawing in a modeling prototype includes one or data processors and a computer-readable medium encoded with instructions for commanding the one or more processors to execute steps. In the steps, a data structure associated with a visual model is accessed. The visual model is analyzed to extract construct-relevant features, where the construct-relevant features are extracted using a drawing object by identifying visual attributes of the visual model and populating a data structure for each object drawn. The visual model is analyzed to generate a statistical model, where the statistical model is generated using a multidimensional scoring rubric by targeting different constructs which compositely estimate learning progression levels, wherein the statistical model is based on features that are principally aligned with one or more of the constructs. An automated scoring is determined based on the construct-relevant features and the statistical model, where the automated scoring is stored in a computer readable medium and is outputted for display on a graphical user interface, transmitted across a computer network, or printed.

As a further example, a computer-readable medium is encoded with instructions for commanding one or more data processors to execute a method for processing a drawing in a modeling prototype. In the method, a data structure associated with a visual model is accessed. The visual model is analyzed to extract construct-relevant features, where the construct-relevant features are extracted using a drawing object by identifying visual attributes of the visual model and populating a data structure for each object drawn. The visual model is analyzed to generate a statistical model, where the statistical model is generated using a multidimensional scoring rubric by targeting different constructs which compositely estimate learning progression levels, wherein the statistical model is based on features that are principally aligned with one or more of the constructs. An automated scoring is determined based on the construct-relevant features and the statistical model, where the automated scoring is stored in a computer readable medium and is outputted for display on a graphical user interface, transmitted across a computer network, or printed.

BRIEF DESCRIPTION OF THE FIGURES

FIG. 11 is a table that reflects marginal correlations of individual feature against human scoring dimensions.

DETAILED DESCRIPTION

Figure 1:
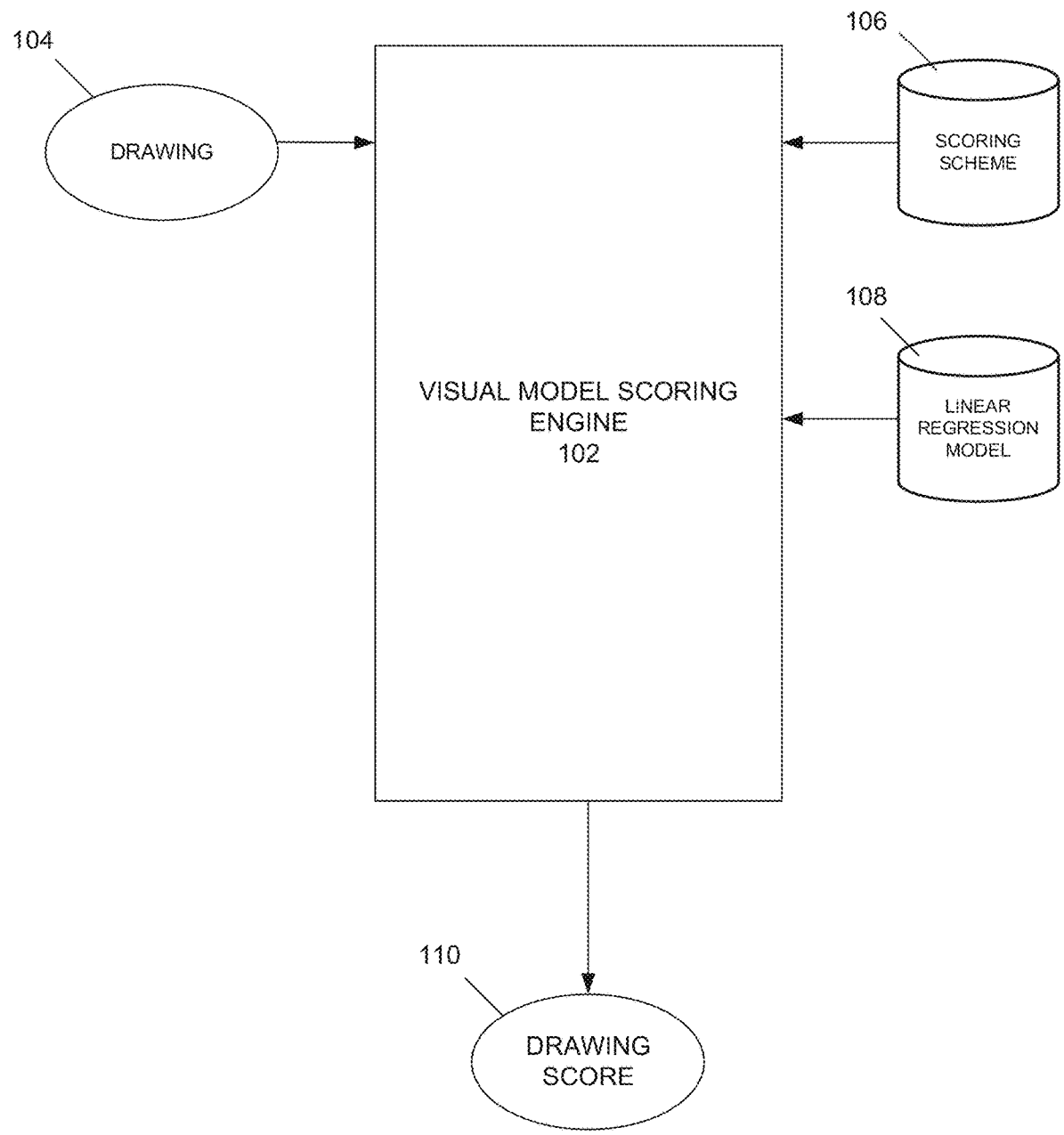
FIG. 1 is a block diagram depicting a computer-implemented system for processing a drawing in a modeling prototype.

Systems and methods as described herein automatically score visual models of scientific concepts drawn by students. Visual models of scientific concepts drawn by students affords expanded opportunities for students to show their understanding of subject matter, but also introduces other elements characterized by artistic creativity and complexity. A standardized feature extraction framework for automated scoring of visual models applied to a scientific concept is provided. This disclosure is provided in the context of visual models representing concepts related to the concept of Matter (i.e., the substance or substances of which any physical object consists or is composed) and its behavior. The techniques herein are equally applicable to mathematics, science, and other concepts. This framework disentangles the interaction between student scientific modeling skill from their art skill of representing real objects and provides for a fair and valid way to assess understanding of subjects Matter by students.

In one example, preliminary evaluation of models constructed by the standardized feature set achieved accuracy of up to 88%, and was able to explain approximately 46% of the variance in learning progression scores obtained by students.

Assessment experts have noted that new reforms in science education require innovative assessments to probe multiple dimensions of science knowledge such as core ideas and science practices. Policy experts and science education researchers have also called for the use of learning progressions (LPs) to guide assessment development in order to develop more diagnostic tools of knowledge acquired by students and the ability to inform instruction.

The Next Generation Science Standards (NGSS) explicitly identified modeling as one central and valued practice, and modeling is also identified as an important practice in mathematics. The visual models constructed by students can serve as rich vehicles of information for educators interested in supporting and assessing what students know and can do in science.

In one example, a new computer-based science assessment aligned with the NGSS and a learning progression (LP) was developed in order to determine if we better measures of student learning in science could be built. A core disciplinary idea (i.e. Matter) and a central practice (i.e. developing and using models) were selected as the target constructs for the assessment prototype that addressed the multidimensional features of science learning.

In one example, hand-written drawn models by students were employed as a rich source of evidence to explore what they know about the structure and behavior of Matter, and these were used to construct an LP for Matter. However, challenges remained with regards to a large scale assessment of drawings by students. One obvious hurdle was the expensive labor costs associated with human scoring of such drawings at scale.

To develop the various computer evaluation system described herein, ways to automate the scoring process to assess object-based drawings generated by students were explored. A fair and valid assessment of drawings must disentangle the interaction between the scientific modeling skills and the art skills of representing real objects by students. The findings resulted in an updated knowledge of cutting-edge automated scoring methods that can be applied to score student-generated models, and also inform process of designing modeling prototypes to measure integrated science competency.

Human scoring of visual models are based on a developed scoring rubric that are mapped with the learning progression for Matter. The scoring scheme for this example includes four dimensions that address the scale (S), material identity (MI), behavior (B), and distribution (D) of particles concerned with Matter LP. For a given visual model, the scale dimension measures understanding of hierarchical composition of Matter beginning with the smallest units e.g. nanoscopic particles. The material identity dimension examines the anticipated number of particle identities present. The behavior dimension examines if/how particle movement is represented. The distribution dimension examines positions of individual particles and space between them in liquid Matter state. In order to climb the learning progression, a student must exhibit a mastery of levels anticipated in each dimension. For example, progression from LP-3 to LP-4 requires a mastery of level 3 in scale dimension and a minimum of level 2 in behavior dimension.

In one example, a table showed a mapping between Learning Progression (LP) levels and levels in each human scoring dimension. For a given LP level, indication of a 'X' meant the minimum level that must be mastered in that associated dimension.

|      | S |   |   |   | MI |   |   | B |   |   |   | MI |   |   |
|------|---|---|---|---|----|---|---|---|---|---|---|----|---|---|
|      | 0 | 1 | 2 | 3 | 0  | 1 | 2 | 0 | 1 | 2 | 3 | 0  | 1 | 2 |
| LP-1 | X | X |   |   | X  | X |   | X |   |   |   | X  |   |   |
| LP-2 |   | X | X |   |    | X |   |   | X | X |   | X  |   |   |
| LP-3 |   |   | X | X |    | X | X |   |   | X | X |    | X |   |
| LP-4 |   |   |   | X |    |   | X |   |   | X | X |    | X | X |
| LP-5 |   |   |   | X |    |   | X |   |   |   | X |    |   | X |

In an example, visual models were collected through a pilot study that explored the implementation of a formative assessment prototype in two science classroom settings. In both classroom settings, teachers used the prototype assessment task to help students learn about the core idea of Matter. The formative assessment task was delivered online and students worked in pairs to input responses due to lack of access to technology in both classroom settings. Both teachers implemented the assessment task during a relevant unit of science instruction. Before implementing the task, both teachers received a one-day professional development training on strategies for using formative assessment, the underlying science competency model, and the Matter LPs, the formative assessment task, and relevant supporting materials for implementation (e.g., the teacher handbook and scoring rubrics).

Figure 10:
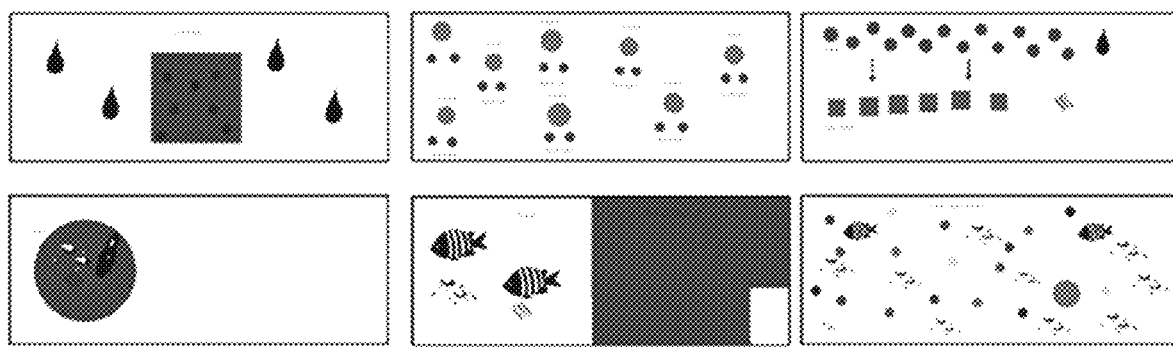
FIG. 10 shows examples of models generated using a computer system by students to illustrate scientific models of pure water (first row) and ocean water (second row).

In an example, students were asked to draw and refine models of pure water and ocean water. Modeling items involved the use of a computer-based drawing tool in which students used a virtual pen or selected from a pool of predefined objects, including abstract objects (e.g., circles, squares, etc.) and concrete representations (e.g., fish, rocks, water drops, sand), to allow students to express their idea of structure of Matter. The drawing tool also allowed students to change the size or color of selected objects, add arrows to represent motion, and label objects. In total, about 1123 student drawings of particle models of Matter were collected, about half of which were human coded by two individual raters. FIG. 10 shows examples of models generated using a computer system by students to illustrate scientific models of pure water (first row) and ocean water (second row). Students had at their disposal to use micro-objects, macro-objects, labels, and pictures, where micro-objects={circle, square, triangle, diamond}, macro-objects={fish, water drops, water steam, algae, salt, etc.}. Directional arrows could also be used to illustrate behavioral patterns of water molecules.

In the example, it was found most students' models were scored at a low level i.e. they held macroscopic conceptions of Matter, and only a small fraction of students' models were scored at high levels i.e. they held beginning or well developed nanoscopic conceptions of Matter. On average, 81.5% of student responses were scored at level 1 or 2, while 17.5% were scored at level 3 or 4 (with only 2.5% at level 4). Additionally, it was found that many students held mixed model 8% of pure water models were mixed model with overt or less overt macro representations; 29% of ocean water models were mixed model with overt or less overt macro representations.

In the example, students exhibited widely contrasting approaches to visual modeling even within the same concept (pure water or ocean water). Freedom in choice of modeling tools was necessary to elicit responses corresponding to true underlying understanding of concepts, at the same time affording a richness of expression in conveying that understanding. However, variations in the choice, color, scale, position and motion of objects suggested standardization of an evaluation framework was not only necessary for a fair and valid assessment, but also required for building models for automated scoring of these visual models.

In an embodiment, two key steps were adopted by automated scoring approaches for high-stakes learning assessment. First, construct-relevant features were extracted from the data that were correlated to human ratings on the scoring dimensions. Second, statistical models were built using these features to automate the scoring process. Given the visual nature of the dataset, the embodiment focused on a unimodal approach.

In one example, verbal description of models such as "my model shows rain drops and blue squares because the square represents the ocean and the drops represent the rain" were also available for analysis using natural language processing techniques.

Regarding the drawing object, in an embodiment, each visual model was a response by a student elicited in the form of a drawing in the computer implemented modeling prototype system. The visual attributes of the drawing were located in the corresponding Javascript Object Notation (JSON) file that was self-descriptive. For each object drawn, JSON encoded its type, color (RGB with an alpha channel for specific opacity), text, X-Y coordinates, height, width and rotation in degrees. Each object drawn was one of macro-objects, micro-objects, label, or arrow.

Regarding the inserted textual description, in one example, in the case of label, the student could elect to insert a textual description.

In one example, data cleaning was necessary prior to the feature extraction. Of the 1123 JSON files generated, 453 with meaningful content were obtained after the cleaning step where (1) empty JSON files were removed (2) JSON files that failed the parser were dropped. Additionally, for each of the 453 JSON files that remained, a heuristics-based preprocessing step was performed to ensure the integrity of the finalized model features.

Regarding the background micro-object, in an example, for any pair of overlapping micro-objects, the one that is used entirely as a background below the other micro-object was removed, as such an object added no semantics to overall understanding by students. This preprocessing ensured that each remaining micro-object would not be obscured by any other micro objects.

The multidimensional scoring rubric target different constructs which compositely estimate the learning progression level of a student. In an embodiment, two categories of features, counting-based features and spatial-based features, were hypothesized, each principally aligned with one or more of the constructs to ensure coverage in the scoring process.

Regarding the counting-based features, a basic understanding of each scientific concept during visual modeling rested on knowledge of the number of type of particles present. This was 1 for pure water model and 2 for ocean water model (salt and water particles), and a unique particle identity could be specified by color, type or a combination of both using micro-objects. Deviation from these expected counts indicated a significant gap in material identity awareness. Likewise, macro-objects such as fishes and water drops when overused relative to micro-objects signaled shallow understanding in the scale dimension. Behavioral wise, arrows indicated direction of movement of particles and their lengths were used to gauge velocity of such movements.

Regarding the spatial-based features, two aspects that specifically target the distributive property of particles were worth concern. To estimate spatial tightness and looseness, the k-Nearest Neighbor (k-NN) algorithm was adopted to compute inter-particle distances. k=3 was used for a local approximation of proximity, and k=10 was used for a more global approximation. For a given visual model, the dispersion feature computed the number of particles per unit area per particle type, and averaging over all particle types. A larger dispersion value was suggestive of the same number of particles drawn over a larger canvas area in the visual model.

In one example, the table in FIG. 11 reflected marginal correlations of individual feature against human scoring dimensions. The columns included: S=Scale; MI=Material Identity; B=Behavior; D=Distribution; LP=Learning Progression. Except for macro-object types, all other features were based on micro-objects. Magnitude-wise, the largest correlation in each feature category per dimension was underlined, while the largest correlation overall within a dimension was in bold.

Regarding the visual model score, in one example, given the numeric labels assigned to each LP level, it was possible to formulate the score prediction process as a supervised task of regression or classification using learners with matured statistical properties and explainable outputs, which were recommended for high-stakes assessment tasks.

In the example, RSMTool was used for building and evaluating the learners that were potentially deployable as the automated scoring system. RSMTool is a python package which automates and combines in a single pipeline multiple analyses that are commonly conducted when building and evaluating automated scoring models.

Figure 12:
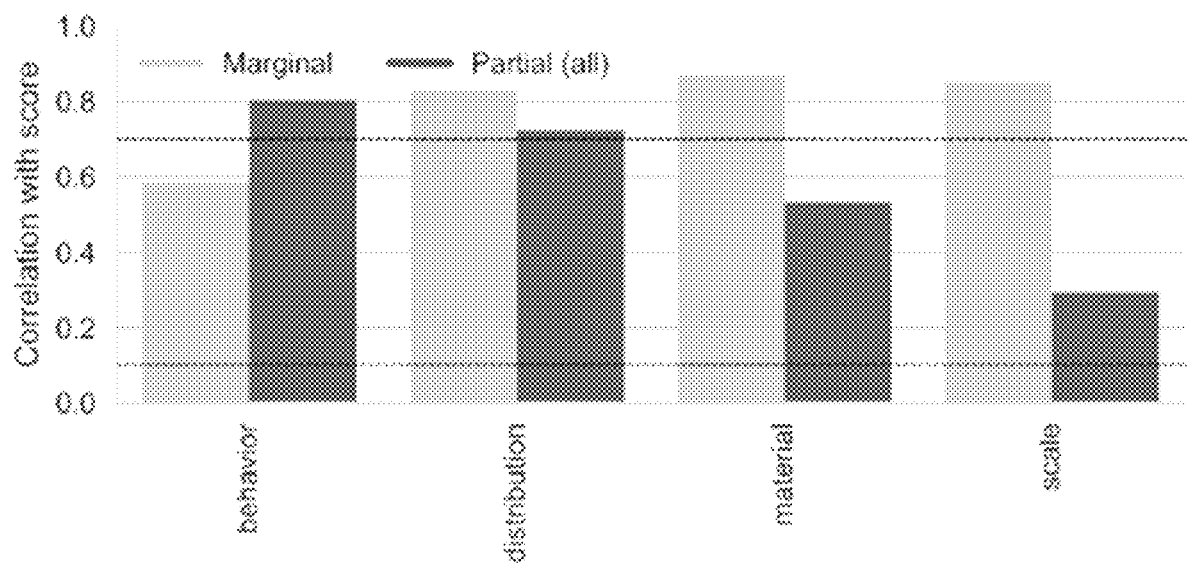
FIG. 12 is a table that shows marginal correlations based on the training partition for each feature computed against each of the scoring dimensions.

In an example, the 263 visual models represented by JSONs were shuffled randomly and then split into 237 JSONs for training and 26 JSONs for evaluation respectively. Of these, 70-10 train-evaluation split was for pure water model, while 167-16 split was for ocean water model. Counting-based and spatial-based features were extracted for a total of 10 features per visual model. Specifically, log transformations were applied to spatial features for data smoothing. Marginal correlations based on the training partition for each feature computed against each of the scoring dimensions, as well as LP, were shown in the table in FIG. 12.

In the example, given that LP level prediction was the ultimate goal for learning assessments on Matter, RSMTool was used to build a linear regression model using all available features and compute associated statistics. Additionally, the task was framed in a classification setting using several classification models noted for their effectiveness. The overall accuracies were reported the previous table.

In the example, a number of observations regarding correlations were made by referring to the table. First, the consistent negative correlations of the macro-object types feature across the different dimensions indicated that understanding levels of Matter were less sophisticated when students focused on drawing more macroscopic objects rather than explaining the microscopic or nanoscopic aspects of Matter. This was particularly evident of modeling the scale dimension. Second, the number of arrows, their direction and randomness almost exclusively accounted for showing understanding of the behavior of particles in Matter by students when compared to other features. Third, it was observed that all spatial-based features bore promising correlations ($|r|\sim0.50$) in modeling the distribution dimension. Specifically, the dispersion feature stood out among all features in it consistency modeling all except for the behavior dimension. The EIC deviation was the only one that was engineered to target concept-specific visual model, where its value was dependent on whether the model was pure water and ocean water. Expectedly, this feature had a correlation of $-0.393$ for the material identity dimension, which indicated students would be penalized for deviating away from the expected number of identities anticipated.

In the example, after controlling for all other variables, analysis suggested that micro-object types, macro-object types, arrows and dispersion features were the most correlated with LP with partial correlations of 0.18, $-0.25$, 0.26 and $-0.20$ respectively. This finding called for students to target an all-around visual modeling approach that focus on microscopic aspects of Matter, its behavior and taking advantage of the entire canvas while doing so.

In an example, a comparative evaluation of models were built using both regressors and classifiers, as shown in the following table. In the table, learners with the same accuracy numbers displayed significantly different confusion matrices, indicating different strengths at modeling different LP levels. Though LP levels could be classified numerically, prediction accuracy was consistently better using regression-based learners of which the maximum was achieved at 0.88. An adjusted $R^2$ of 0.46 was reported in liner regression model, which suggests that approximately half the variance in LP level differences could be accounted for by a simple model based on linear regression model using the feature set proposed.

| Learner | Accuracy |
| --- | --- |
| Linear Regression | 0.81 |
| Decision Tree Regression | 0.88 |
| Random Forest Regression | 0.88 |
| Logistic Regression Classifier | 0.65 |
| Decision Tree Classifier | 0.65 |
| Random Forest Classifier | 0.65 |

In an example, it was suggested that further feature engineering associated with the model scores with a broad-based sample covering the full range of the score levels (or learning progression levels) would produce convincing results. It was suggested that related efforts would be targeted toward constructs with high partial correlations to LP, namely the behavior and distribution dimension.

FIG. 1 is a block diagram depicting a computer-implemented system for processing a drawing in a modeling prototype. A visual model scoring engine 102 accesses a data structure 104 associated with a drawing. The scoring engine 102 may access one or more schemes 106 that contain data to assist in automatically extracting metrics from the drawing 104, such as described above. For example, a scoring scheme 106 may be accessed to facilitate generation of a scoring rubric, a linear regression model 108 may be accessed to facilitate generation of a learning progression level, the visual model scoring engine, in one example, determines one or more of construct-relevant features, a statistical model, a scoring rubric, an integrity of the finalized model features, and a background micro-object based on the features extracted from the drawing 104. Those determined features are output from the engine 102 as a drawing score 110.

Figure 2:
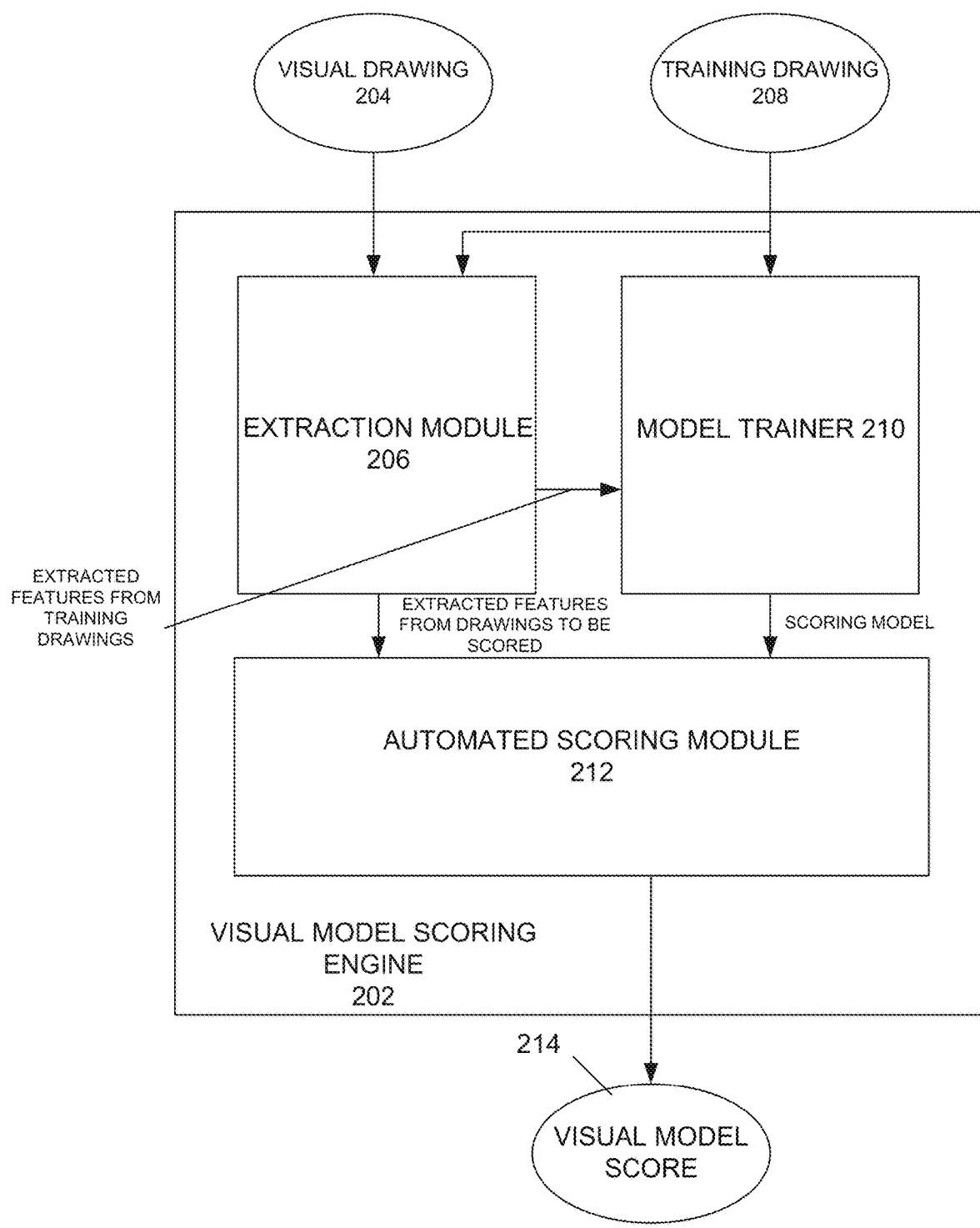
FIG. 2 is a block diagram depicting a computer-implemented system for processing a drawing to generate a visual model score that is transmitted across a computer network or displayed on a graphical user interface.

FIG. 2 is a block diagram depicting a computer-implemented system for processing a drawing to generate a visual model score that is transmitted across a computer network or displayed on a graphical user interface. In the example of FIG. 2, the visual model scoring engine 202 includes an extraction module 206 that receives a data structure associated with a visual drawing 204. In the example of FIG. 2, the visual model scoring engine 202 includes a model trainer 210 that receives a data structure associated with a training drawing 204. In the example of FIG. 2, the visual model scoring engine 202 includes an automated scoring model that receives the output from the extraction module 206 and the output from the model trainer 210 to generate a visual model score. In another example, the engine 202 includes a prediction module that generates a score prediction. In another example, the engine 202 includes a scoring module that generates a scoring rubric. In another example, the engine 202 includes a learning progression module that generates a learning progression level.

Figure 3:
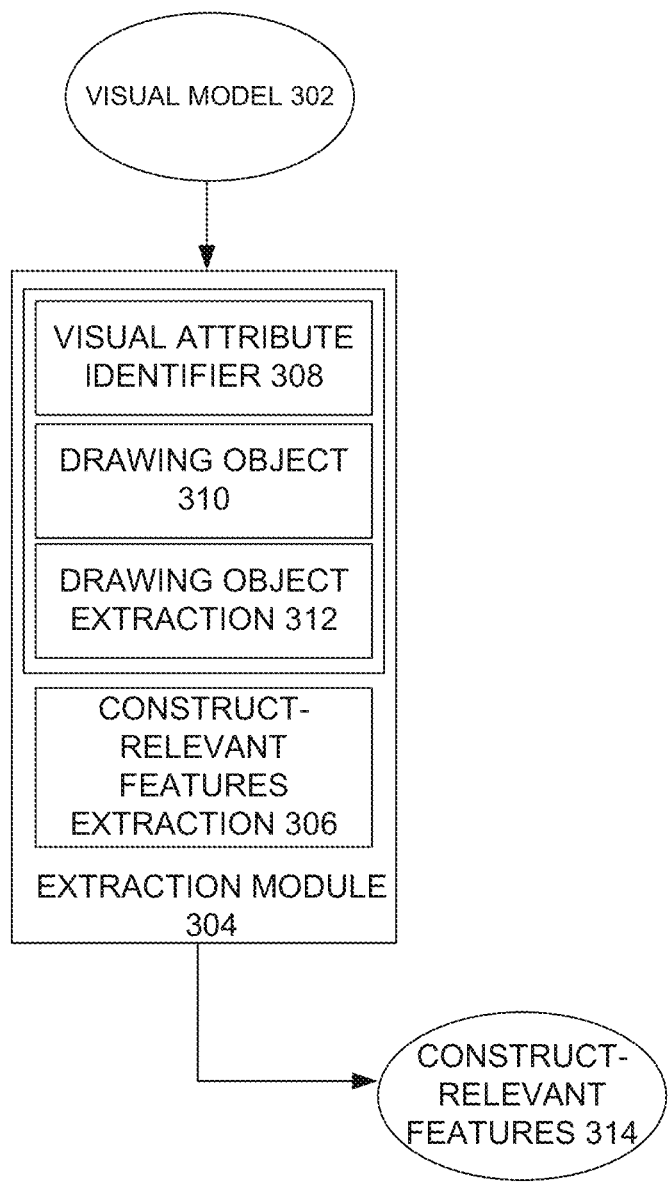
FIG. 3 is a diagram depicting a computer-implemented extraction module for extracting construct-relevant features from a visual model.

FIG. 3 is a diagram depicting a computer-implemented extraction module for extracting construct-relevant features from a visual model. The construct-relevant features 314 are extracted from the visual model 302. The extraction module at 304 extracts construct-relevant features at 306. The construct-relevant features 314 are extracted using a drawing object 310. The drawing object is extracted by identifying visual attributes of the visual model at 308 and at 312 populating a data structure for each object drawn.

Figure 4:
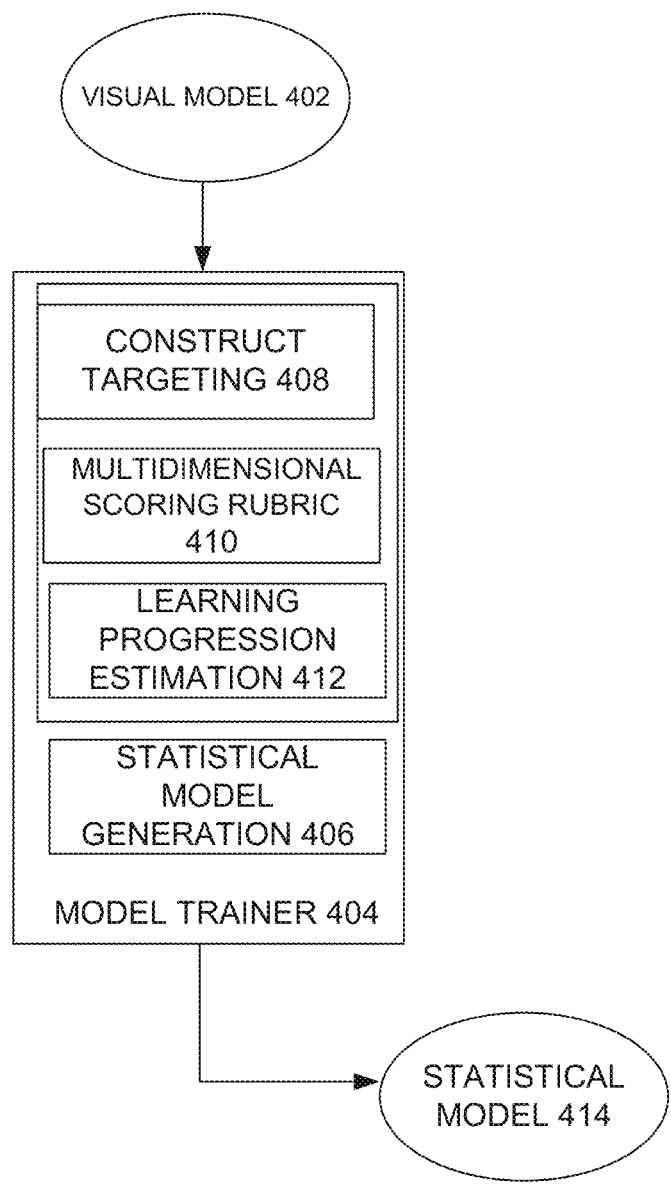
FIG. 4 is a diagram depicting a computer-implemented model trainer for generating a statistical model from a visual model.

FIG. 4 is a diagram depicting a computer-implemented model trainer for generating a statistical model from a visual model. The statistical model 414 is generated from the visual model 402. The model trainer at 404 generates a statistical model at 406. The statistical model is generated using a multidimensional scoring rubric 410. The statistical model 414 is generated by targeting different constructs at 408 and at 412 estimating learning progression levels. In one example, the statistical model is based on features that are principally aligned with one or more of the constructs.

Figure 5:
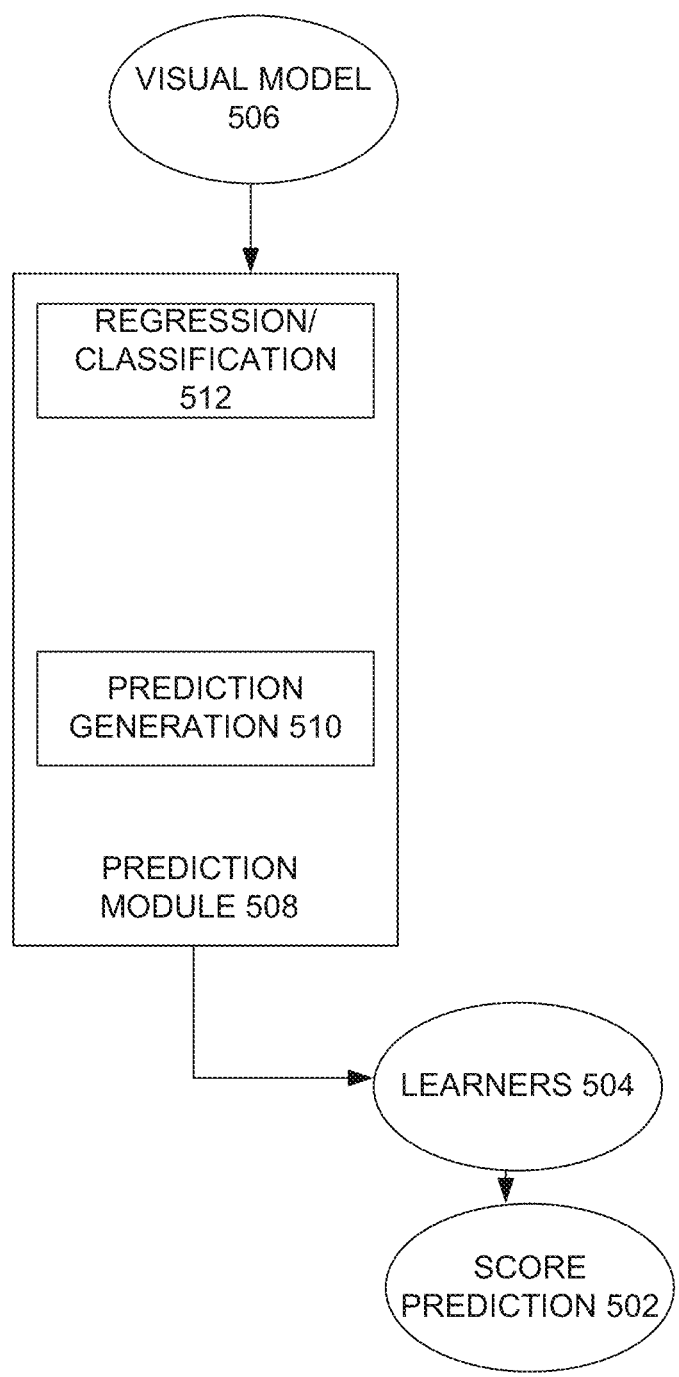
FIG. 5 is a diagram depicting a computer-implemented prediction module for generating a score prediction from a visual model.

FIG. 5 is a diagram depicting a computer-implemented prediction module for generating a score prediction from a visual model. In the example, a score prediction 502 is determined based on learners 504 alone or in combination with other metrics automatically extracted from the visual model 506. The learners 504 are determined by the prediction module 508 at 510 by identifying the learners in the visual model 506 with matured statistical properties and explainable outputs using the supervised task of regression or classification 512. In one example, the score prediction 502 is combined with construct-relevant features and a statistical model to determine a visual model score.

Figure 6:
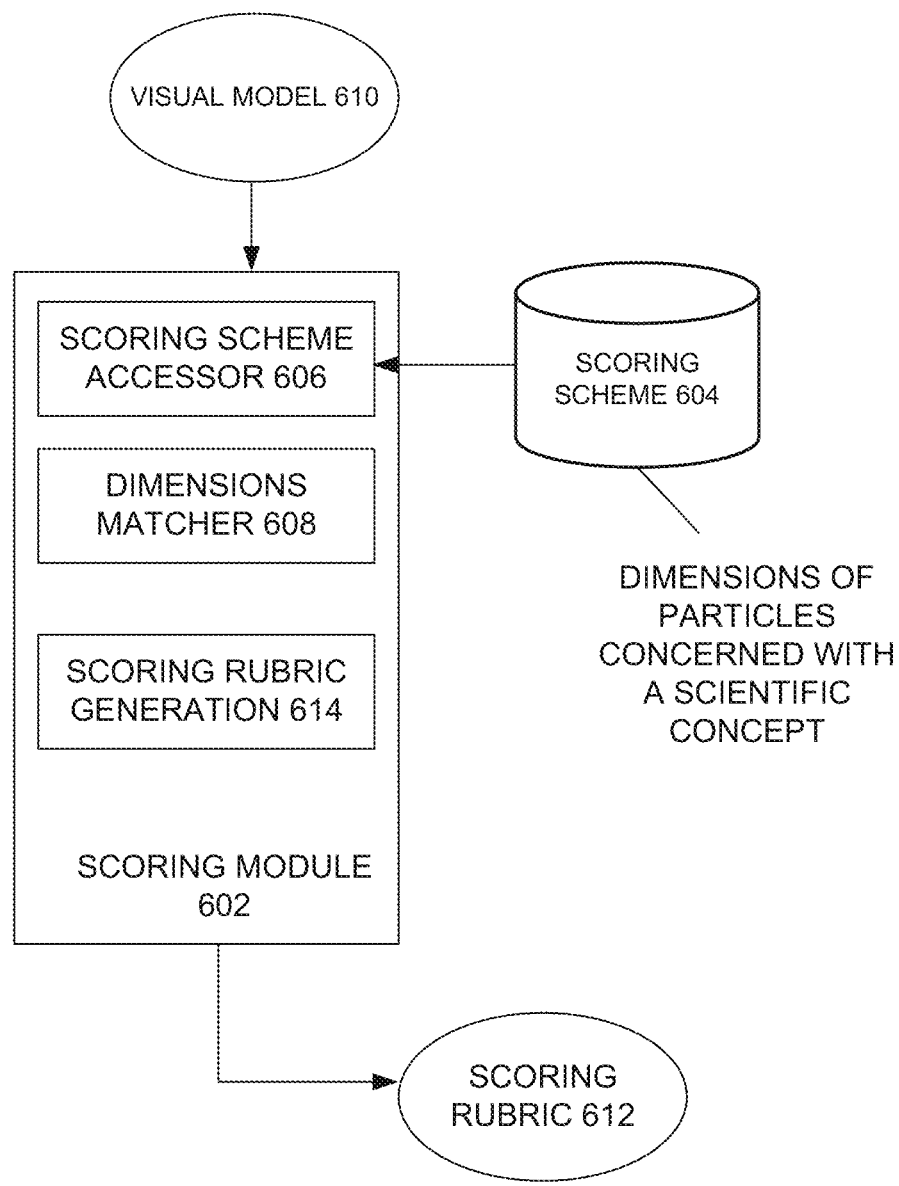
FIG. 6 is a diagram depicting a computer-implemented scoring module for extracting a scoring rubric from a visual model.

FIG. 6 is a diagram depicting a computer-implemented scoring module for extracting a scoring rubric from a visual model. The scoring module 602 accesses a scoring scheme 604 at 466 that identifies dimensions of particles concerned with a scientific concept. At 608, the module 602 extracts the dimensions from the visual model 610 and determines whether each extracted dimension is in the scoring scheme. The scoring rubric 612 is generated at 614 based on dimensions that are located in the scoring scheme 404.

Figure 7:
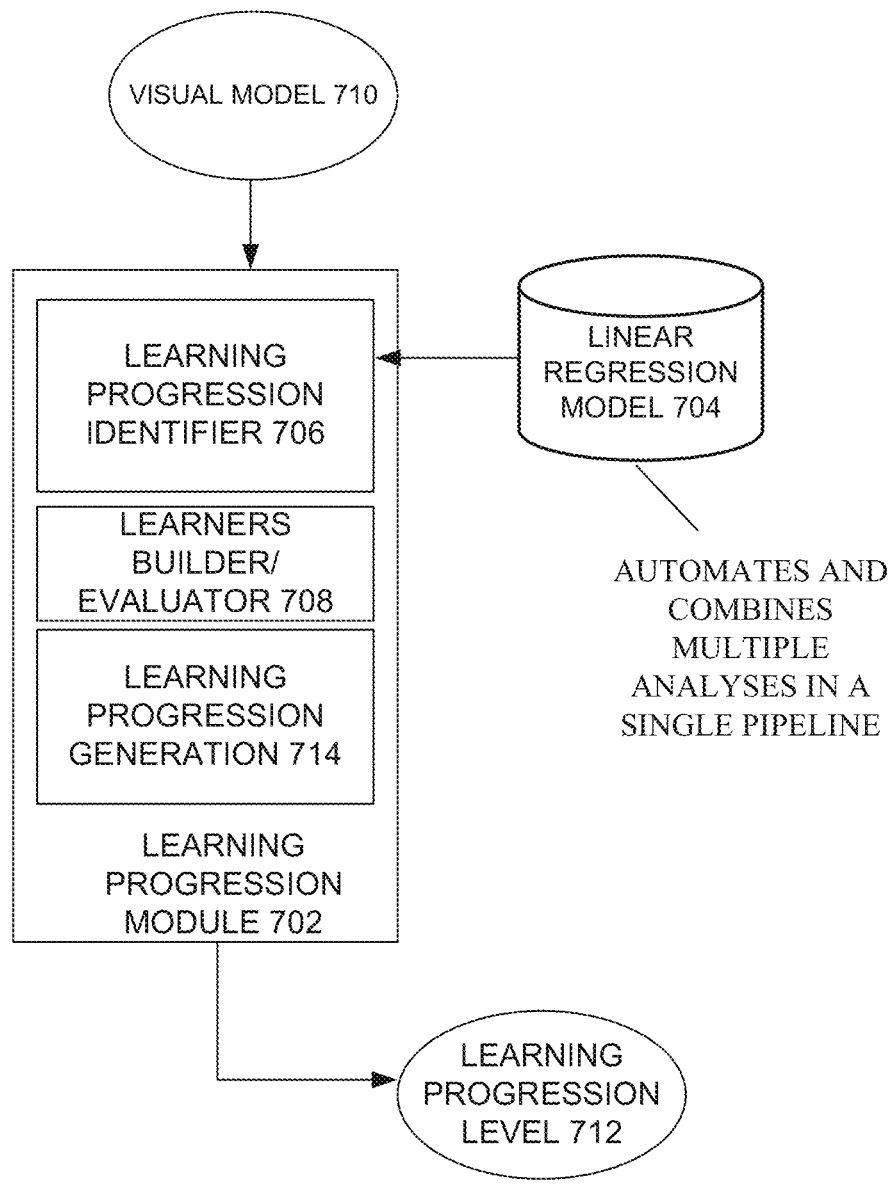
FIG. 7 is a diagram depicting a computer-implemented learning progression module for extracting a learning progression level from a visual model.

FIG. 7 is a diagram depicting a computer-implemented learning progression module for extracting a learning progression level from a visual model. The learning progression module 702 accesses a scoring scheme 704 at 706 that automates and combines multiple analyses in a single pipeline. At 708, the module 702 builds and evaluates learners from the visual model 710. The learning progression level 712 is generated at 714 based on multiple analyses located in the linear regression model 704.

Figure 8:
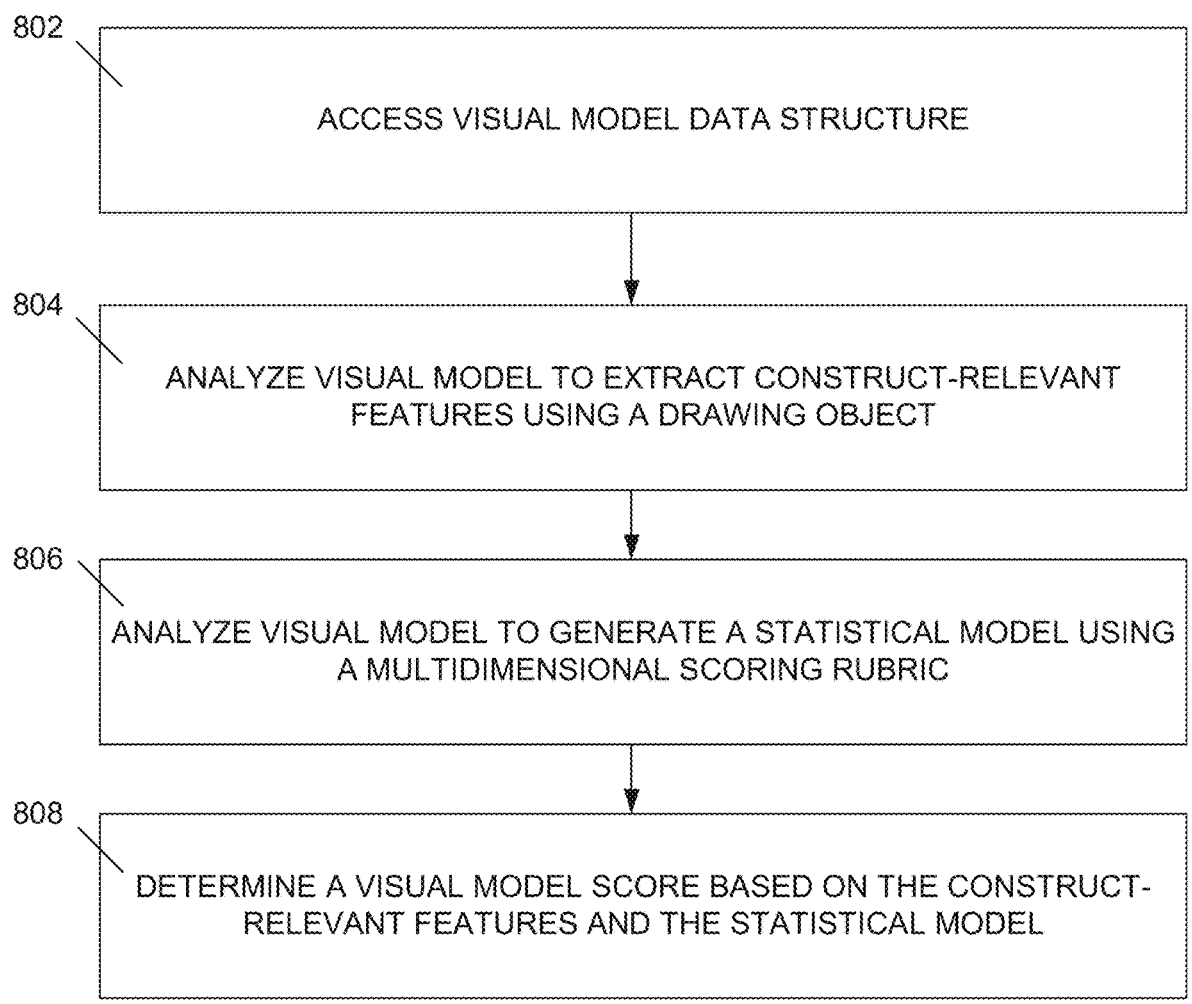
FIG. 8 is a flow diagram depicting a processor-implemented method for processing a drawing in a modeling prototype.

FIG. 8 is a flow diagram depicting a processor-implemented method for processing a drawing in a modeling prototype. A data structure associated with a visual model is accessed at 802. The visual model is analyzed at 804 to extract construct-relevant features, where the construct-relevant features are extracted using a drawing object by identifying visual attributes of the visual model and populating a data structure for each object drawn. The visual model is analyzed at 806 to generate a statistical model, where the statistical model is generated using a multidimensional scoring rubric by targeting different constructs which compositely estimate learning progression levels, wherein the statistical model is based on features that are principally aligned with one or more of the constructs. A visual model score is determined at 808 on the construct-relevant features and the statistical model, where the visual model score is stored in a computer readable medium and is outputted for display on a graphical user interface, transmitted across a computer network, or printed.

Figure 9A:
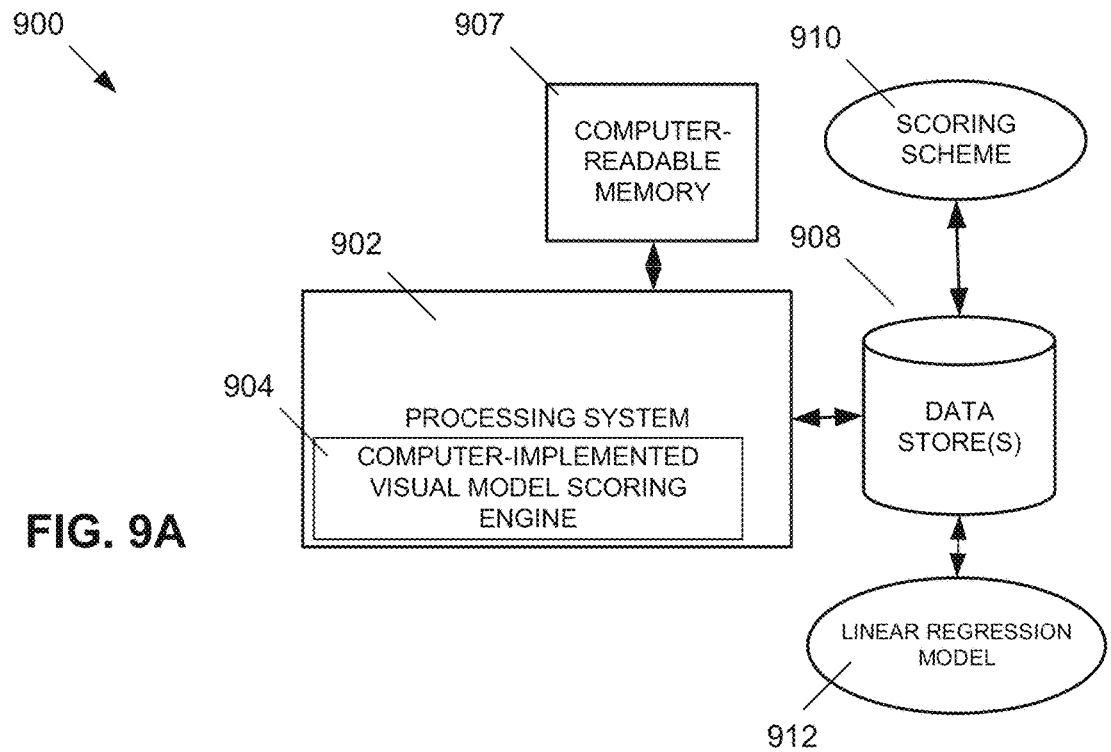
FIGS. 9A, 9B, and 9C depict example systems for implementing the approaches described herein for automatically scoring a visual model in a modeling prototype.
Figure 9B:
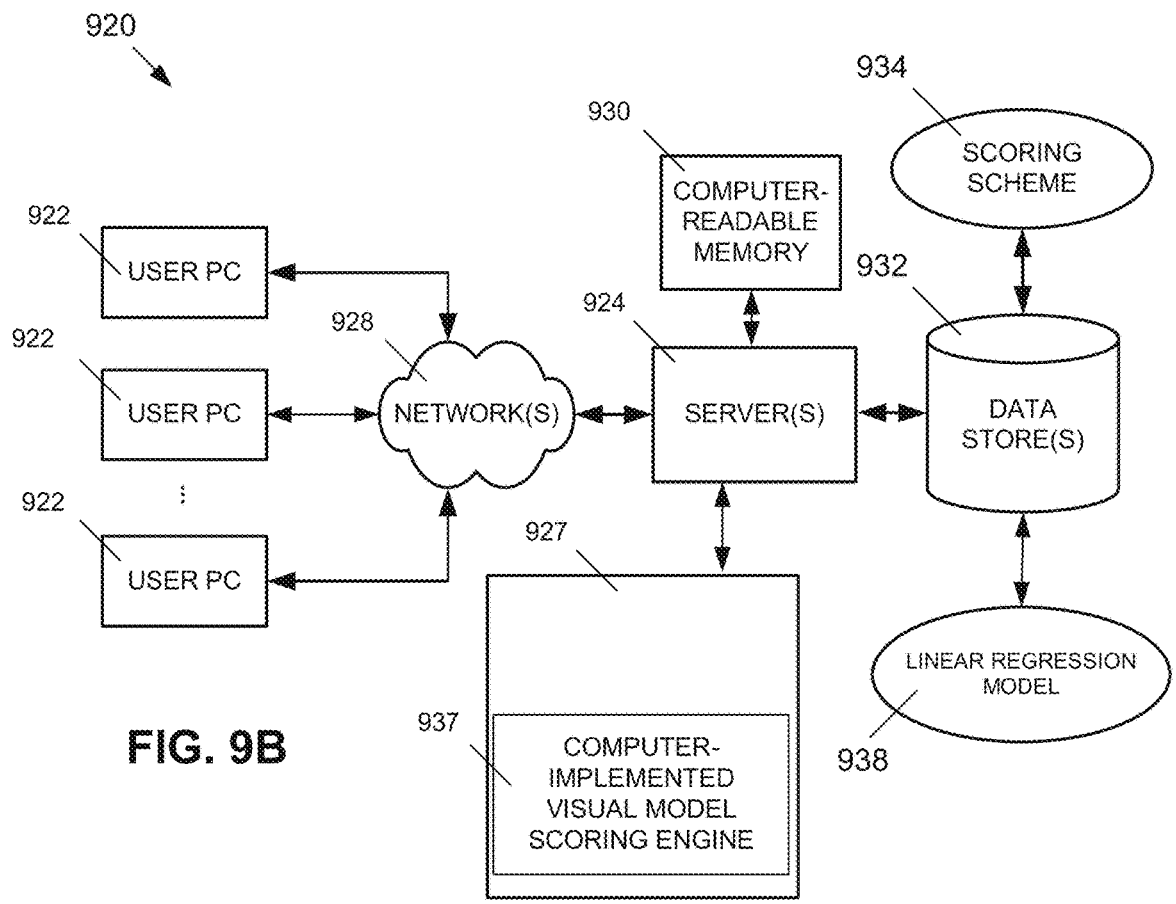
Figure 9C:
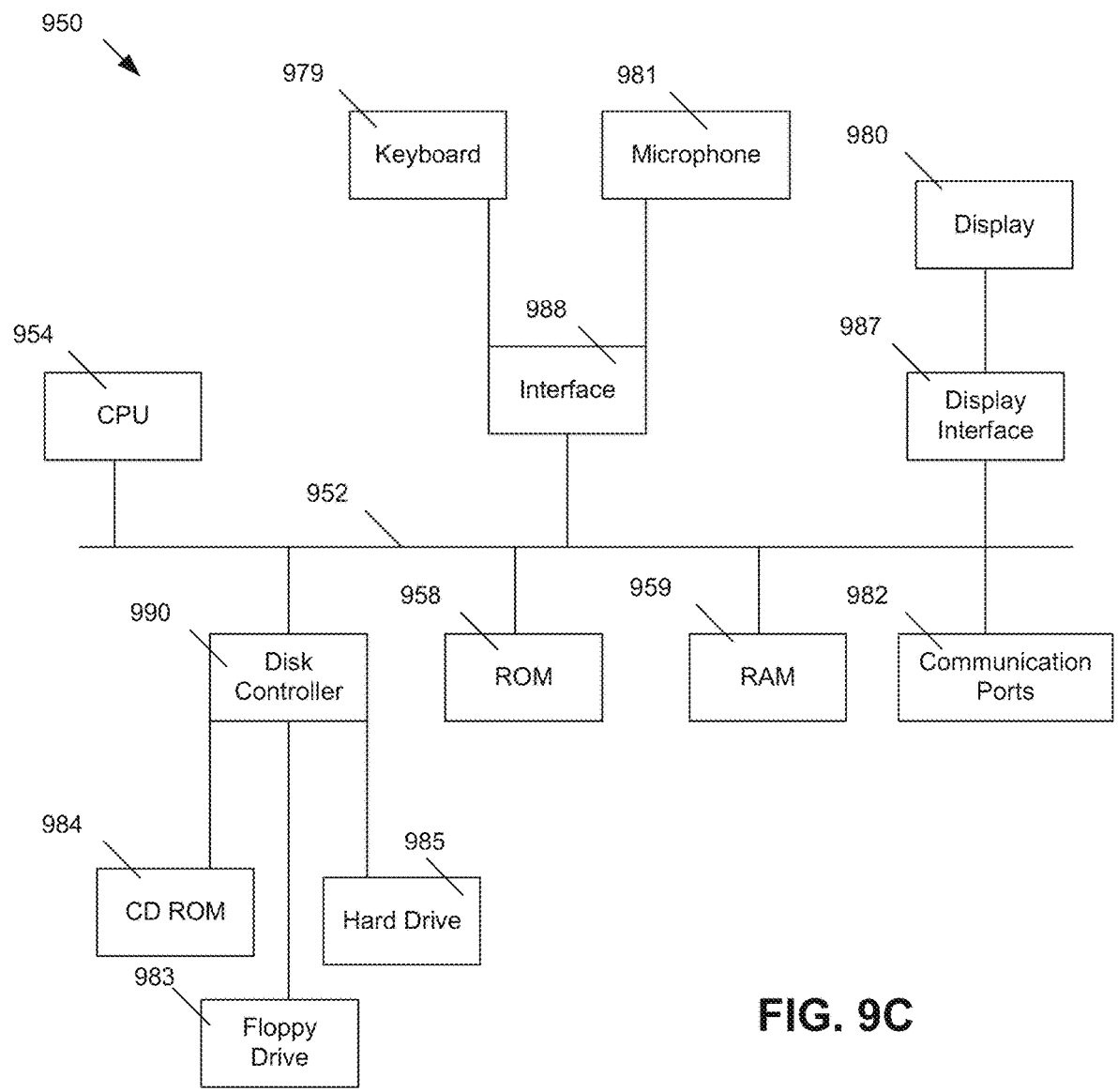

FIGS. 9A, 9B, and 9C depict example systems for implementing the approaches described herein for automatically scoring a visual model in a modeling prototype. For example, FIG. 9A depicts an exemplary system 900 that includes a standalone computer architecture where a processing system 902 (e.g., one or more computer processors located in a given computer or in multiple computers that may be separate and distinct from one another) includes a computer-implemented visual model scoring engine 904 being executed on the processing system 902. The processing system 902 has access to a computer-readable memory 907 in addition to one or more data stores 908. The one or more data stores 908 may include a scoring scheme 910 as well as a linear regression model 912. The processing system 902 may be a distributed parallel computing environment, which may be used to handle very large-scale data sets.

FIG. 9B depicts a system 920 that includes a client-server architecture. One or more user PCs 922 access one or more servers 924 running a visual model scoring engine 937 on a processing system 927 via one or more networks 928. The one or more servers 924 may access a computer-readable memory 930 as well as one or more data stores 932. The one or more data stores 932 may include a scoring scheme 934 as well as a linear regression model 938.

FIG. 9C shows a block diagram of exemplary hardware for a standalone computer architecture 950, such as the architecture depicted in FIG. 9A that may be used to include and/or implement the program instructions of system embodiments of the present disclosure. A bus 952 may serve as the information highway interconnecting the other illustrated components of the hardware. A processing system 954 labeled CPU (central processing unit) (e.g., one or more computer processors at a given computer or at multiple computers), may perform calculations and logic operations required to execute a program. A non-transitory processor-readable storage medium, such as read only memory (ROM) 958 and random access memory (RAM) 959, may be in communication with the processing system 954 and may include one or more programming instructions for performing the method of automatically scoring a visual model in a modeling prototype. Optionally, program instructions may be stored on a non-transitory computer-readable storage medium such as a magnetic disk, optical disk, recordable memory device, flash memory, or other physical storage medium.

In FIGS. 9A, 9B, and 9C, computer readable memories 907, 930, 958, 959 or data stores 908, 932, 983, 984, 988 may include one or more data structures for storing and associating various data used in the example systems automatically scoring a visual model in a modeling prototype. For example, a data structure stored in any of the aforementioned locations may be used to store data from XML files, initial parameters, and/or data for other variables described herein. A disk controller 990 interfaces one or more optional disk drives to the system bus 952. These disk drives may be external or internal floppy disk drives such as 983, external or internal CD-ROM, CD-R, CD-RW or DVD drives such as 984, or external or internal hard drives 985. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 990, the ROM 958 and/or the RAM 959. The processor 954 may access one or more components as required.

A display interface 987 may permit information from the bus 952 to be displayed on a display 980 in audio, graphic, or alphanumeric format. Communication with external devices may optionally occur using various communication ports 982.

In addition to these computer-type components, the hardware may also include data input devices, such as a keyboard 979, or other input device 981, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A processor implemented method of processing a drawing in a modeling prototype, the method comprising:
    accessing a data structure associated with a visual model;
    analyzing the visual model to extract construct-relevant features, wherein the construct-relevant features are extracted using a drawing object by identifying visual attributes of the visual model and populating a data structure for each object drawn;
    analyzing the visual model and associated scores to generate a statistical model, wherein the statistical model is generated using a multidimensional scoring rubric by targeting different constructs which compositely estimate learning progression levels, wherein the statistical model is based on features that are principally aligned with one or more of the constructs;
    determining an automated scoring based on the construct-relevant features and the statistical model, wherein the automated scoring is stored in a computer readable medium and is outputted for display on a graphical user interface, transmitted across a computer network, or printed.

2. The method of claim 1, further comprising:
    analyzing the visual model to generate a score prediction, wherein the score prediction is generated using learners with matured statistical properties and explainable outputs by a supervised task of regression or classification.

3. The method of claim 2, further comprising:
    determining a visual model score based on the construct-relevant features, the statistical model, and the score prediction.

4. The method of claim 1, further comprising determining a scoring rubric by accessing a scoring scheme that identifies dimensions of particles concerned with a scientific concept, wherein the scoring rubric is based on dimensions that are located in the scoring scheme.

5. The method of claim 4, wherein the scoring rubric is further based on a proportion of dimensions found in the scoring scheme that address the scale, material identity, behavior, and distribution of particles concerned with the scientific concept.

6. The method of claim 1, wherein the drawing object is further determined using a file that is self-descriptive based on type, color, text, X-Y coordinates, height, width and rotation.

7. The method of claim 1, wherein the construct-relevant features are determined based on a file that is not empty and did not fail the parser.

8. The method of claim 7, further comprising determining the integrity of the finalized model features by performing a heuristics-based preprocessing step.

9. The method of claim 1, wherein the visual attributes are further determined based on one of or a plurality of macro-objects, micro-objects, label, or arrow.

10. The method of claim 9, further comprising determining the label using an inserted textual description.

11. The method of claim 9, further comprising determining a background micro-object by determining a pair of overlapping micro-objects and removing the one used entirely as a background below the other micro-object.

12. The method of claim 1, wherein the statistical model is further determined based on counting-based features and spatial-based features.

13. The method of claim 1, further comprising determining a learning progression level by accessing a linear regression model that automates and combines multiple analyses in a single pipeline, wherein the multiple analyses are determined by building and evaluating learners.

14. The method of claim 1, wherein the drawing object is generated using a computer-based drawing tool by determining input from a virtual pen or selected from a pool of predefined objects.

15. A processor implemented system for processing a drawing in a modeling prototype, comprising:
    one or more data processors;
    a computer-readable medium encoded with instructions for commanding the one or more data processors to execute steps of a process, the steps including:
    accessing a data structure associated with a visual model;
    analyzing the visual model to extract construct-relevant features, wherein the construct-relevant features are extracted using a drawing object by identifying visual attributes of the visual model and populating a data structure for each object drawn;
    analyzing the visual model to generate a statistical model, wherein the statistical model is generated using a multidimensional scoring rubric by targeting different constructs which compositely estimate learning progression levels, wherein the statistical model is based on features that are principally aligned with one or more of the constructs;
    determining an automated scoring based on the construct-relevant features and the statistical model, wherein the automated scoring is stored in a computer readable medium and is outputted for display on a graphical user interface, transmitted across a computer network, or printed.

16. The system of claim 15, the steps further comprising:
    analyzing the visual model to generate a score prediction, wherein the score prediction is generated using learners with matured statistical properties and explainable outputs by a supervised task of regression or classification.

17. The system of claim 16, the steps further comprising:

determining a visual model score based on the construct-relevant features, the statistical model, and the score prediction.

18. The system of claim 15, the steps further comprising determining a scoring rubric by accessing a scoring scheme that identifies dimensions of particles concerned with a scientific concept, wherein the scoring rubric is based on dimensions that are located in the scoring scheme.

19. The system of claim 18, wherein the scoring rubric is further based on a proportion of dimensions found in the scoring scheme that address the scale, material identity, behavior, and distribution of particles concerned with the scientific concept.

20. A non-transitory computer-readable medium encoded with instructions for commanding one or more data processors to execute steps of a method of processing a drawing in a modeling prototype, the steps comprising:

accessing a data structure associated with a visual model;

analyzing the visual model to extract construct-relevant features, wherein the construct-relevant features are extracted using a drawing object by identifying visual attributes of the visual model and populating a data structure for each object drawn;

analyzing the visual model to generate a statistical model, wherein the statistical model is generated using a multidimensional scoring rubric by targeting different constructs which compositely estimate learning progression levels, wherein the statistical model is based on features that are principally aligned with one or more of the constructs;

determining an automated scoring based on the construct-relevant features and the statistical model, wherein the automated scoring is stored in a computer readable medium and is outputted for display on a graphical user interface, transmitted across a computer network, or printed.

\* \* \* \* \*